United States Patent [19]

Chern et al.

[11] Patent Number: 5,371,922
[45] Date of Patent: Dec. 13, 1994

[54] SAFETY DEVICE FOR BABY WALKER

[76] Inventors: Yeong-Shing Chern, No. 13 Lane 212 Fwu-Shan Street; Miin-Tsang Sheu, No. 156 Cheng Kung Road, both of Chang Hua City, Taiwan, Prov. of China

[21] Appl. No.: 107,086

[22] Filed: Aug. 17, 1993

[51] Int. Cl.⁵ .............................................. B60B 33/00
[52] U.S. Cl. ........................................ 16/47; 16/35 R
[58] Field of Search .................. 16/47, 48, 32, 33, 34, 16/35 R, 18 CG, 18 B

[56] References Cited

U.S. PATENT DOCUMENTS

| | | | |
|---|---|---|---|
| 1,105,379 | 7/1914 | Schulze | 16/18 B |
| 2,123,707 | 7/1938 | Bloch | 16/47 |
| 2,197,273 | 4/1940 | Lindeman | 16/18 B |
| 2,701,005 | 2/1955 | Bennett et al. | 16/32 |
| 4,467,496 | 8/1984 | Gregg | 16/18 B |
| 4,534,433 | 8/1985 | Burbank et al. | 16/18 B |
| 5,119,525 | 6/1992 | Melara | 16/47 |
| 5,215,320 | 6/1993 | Chen | 16/35 R |
| 5,259,088 | 11/1993 | Yang | 16/47 |

FOREIGN PATENT DOCUMENTS

4040283A1 8/1991 Germany ..................... 16/18 B

*Primary Examiner*—Kurt C. Rowan
*Assistant Examiner*—Chuck Y. Mah
*Attorney, Agent, or Firm*—Bacon & Thomas

[57] ABSTRACT

The present invention relates to a safety device for a baby walker which has a main wheel and an auxiliary wheel. By using a main wheel lock plate and a telescopic pipe, a ratchet on the main wheel can be prevented from blocking by a lock block under normal circumstances. While moving on a slope the lock plate will block the ratchet by its own weight to control baby walker without sliding. By using an auxiliary wheel lock plate and a fixed spring, the lock can also be blocked in normal circumstances. The auxiliary wheel can be suspended in the air and the movable shaft always faces toward the motion direction. In this way, the baby walker will not fall on a hollow ground (such as stairs) and will automatically stop sliding on a slope, with the lock block blocking the auxiliary wheel ratchet and auxiliary wheel friction surface.

5 Claims, 4 Drawing Sheets

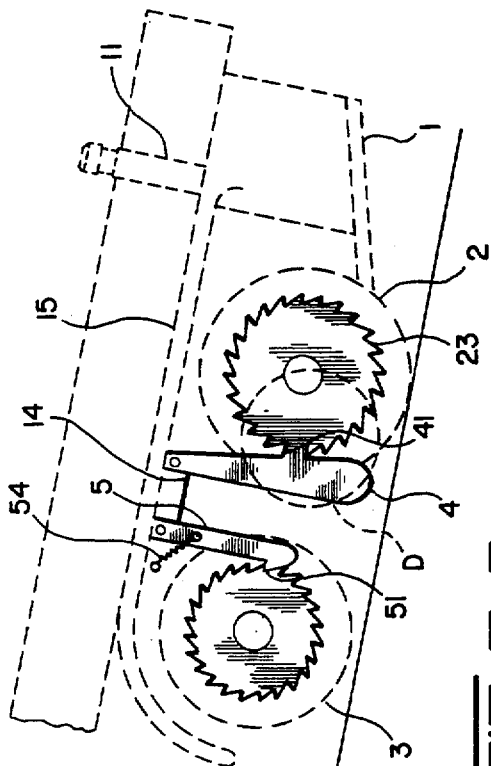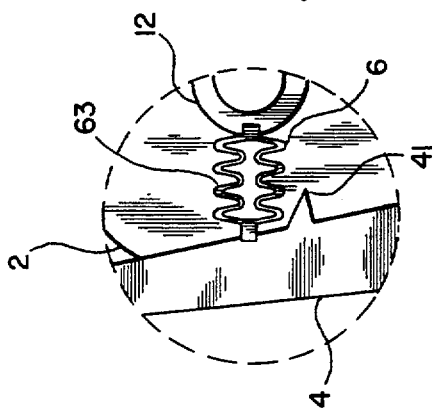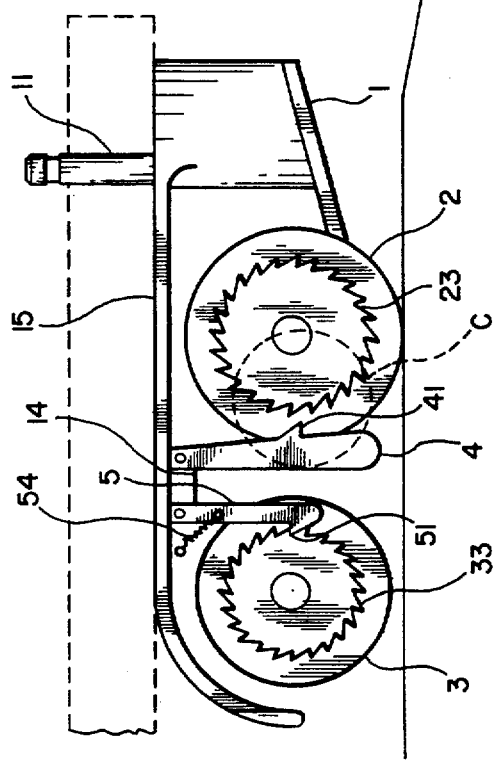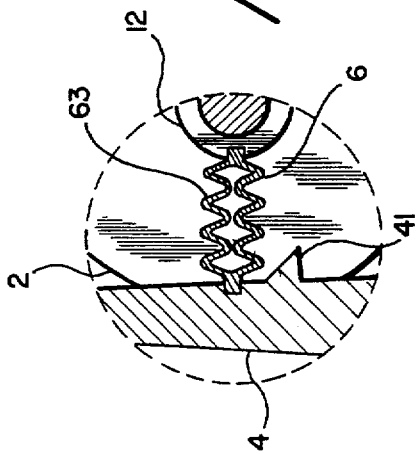

SAFETY DEVICE FOR BABY WALKER

BACKGROUND OF THE INVENTION

A baby walker, as its self-explanatory, should be only suitable for babies who start to learn to walk. They are mostly around one year old and often very active, so they are simply unable to judge where is safe, dangerous, where they can go, what things would hurt them, not to mention to get away from dangerous spots or objects. Take, for example, almost every house has staircases or somethings like stairs around, if a one-year-old baby learns walking with a baby walker without an adult accompanying or limiting the space, the baby walker would possibly fall down or even overturn that would cause a serious accident, like head injury or so. Besides, if a baby pulls the walker to a slope, the walker will slide away because he/she would not know how to stop it from sliding unless the adult sees and pulls the walker back in time, but most probably the walker would be stopped against obstacles and hurt the baby. As we know the conventional safety device for baby walker generally are treated in the baggy seat or circular seat frame to prevent babies from injuries caused by sudden hits, or install an anti-slip part on the wheel unit to serve as a safety device. This anti-slip part will jut out to hinder the walker from moving furtherly as babies sway inside the walker. However, the disadvantage of this kind of safety device is that it cannot prevent the walker from falling or overturning when moving on a hollow or slant ground.

SUMMARY OF THE INVENTION

The main object of the present invention is to provide a safety device for baby walker, particularly only the main wheel can touch the ground and the movable shaft of the wheel unit always faces toward motion direction to drag the walker moving forward. Therefore, when the walker be pulled to a hollow, the main wheel will be suspended first due to the movable shaft going forward, so the walker only can move with auxiliary wheel at this time; and because the lock plate blocks the auxiliary wheel ratchet and the effect from anti-slip wheel surface, the auxiliary wheel cannot move further on and only can back off, unless the walker he moved backward and releasing the suspending main wheel. This unique design not only prevents a baby walker from falling but also provides babies with security when learning walking.

Another object of the present invention also relates to a safety device for baby walker by using a main wheel lock plate and a telescopic pipe with air exhaust hole to control the movement of main wheel. When the baby walker moving on a normal ground, the weight of main wheel lock plate and the flexible telescopic pipe will separate the lock plate and ratchet, so that the walker will not block the ratchet because of the sway producing from the lock plate; when the walker moving on a slope, the lock plate will also slant accordingly and its own gravity will compress the telescopic pipe to block main wheel ratchet to stop the walker from sliding. Thus the protection function is achieved.

BRIEF DESCRIPTION OF THE DRAWINGS

FIG. 5-A is an illustration of the present invention on a normal ground.

FIG. 5-B is an illustration of the present invention on a slope ground.

FIG. 5-C is an enlarged view of area C in FIG. 5-A.

FIG. 5-D is an enlarged view of area D in FIG. 5-B.

DETAILED DESCRIPTION OF THE PREFERRED EMBODIMENTS

Figure 1:
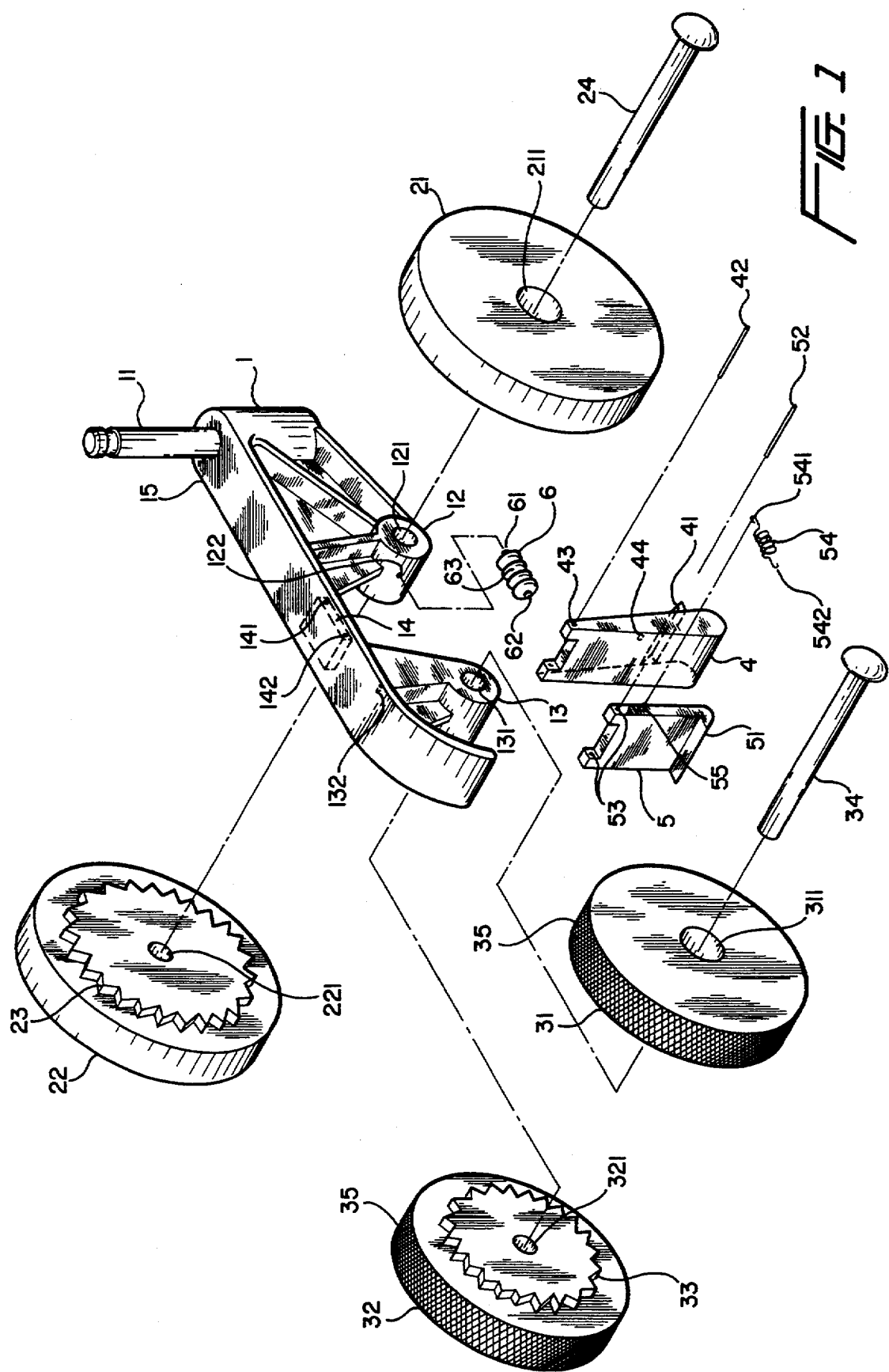
FIG. 1 is a structural exploded view of the present invention.
Figure 2:
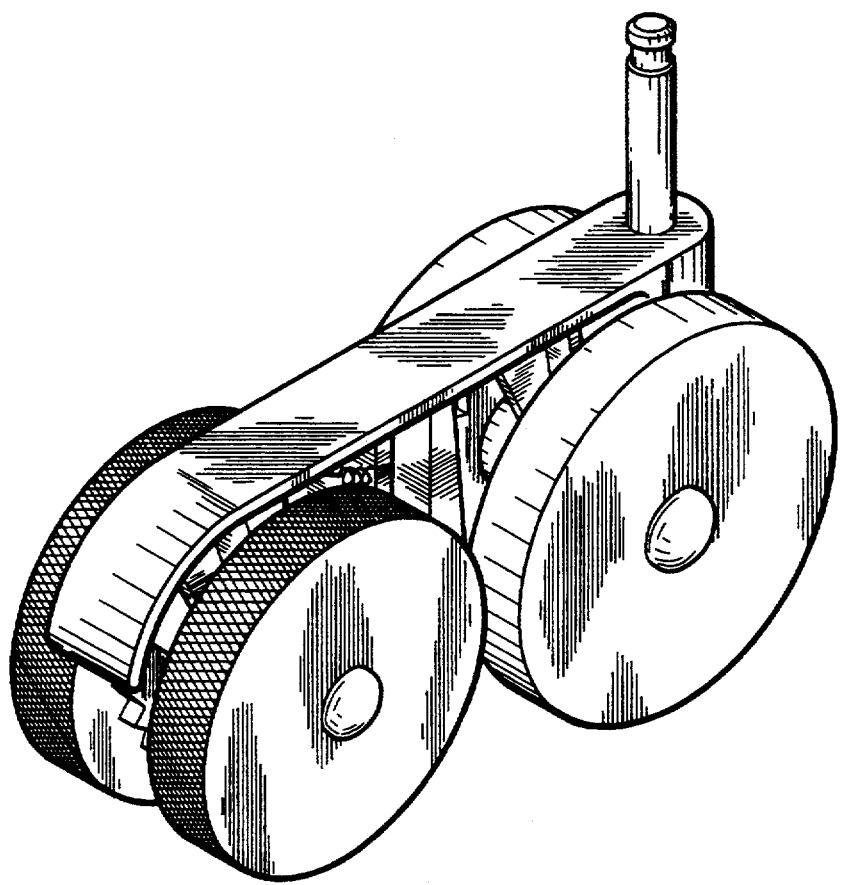
FIG. 2 is an assembly exterior view of the present invention.
Figure 3:
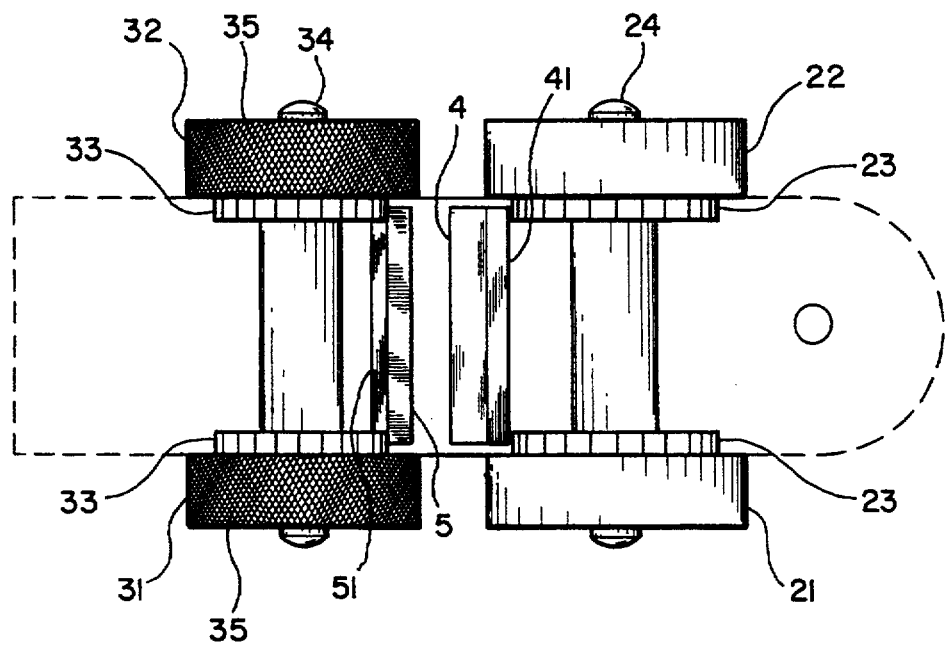
FIG. 3 is a bottomview of the present invention.

Referring to FIG. 1 and 2, the present invention comprises a main wheel unit 2, main wheel lock plate 4, auxiliary wheel unit 3 and auxiliary wheel lock plate 5, which are assembled in a wheel stand 1 for constructing a safety device for baby walker, wherein a main wheel shaft 24 first piercing through the wheel body shaft hole 211 on the right main wheel 21, then through the main wheel shaft hole 121 in the main wheel bearing 12 to couple with the shaft hole 221 on the left main wheel 22, thus a movable main wheel unit 2 is composed. The auxiliary wheel shaft 34 pierces through the wheel body shaft hole 311 on the right auxiliary wheel 31, then through the auxiliary wheel shaft hole 131 in the auxiliary wheel bearing 13 to couple with the shaft hole 321 on the left auxiliary wheel 32, thus a movable auxiliary wheel unit 3 is composed. As for the lock plate section, it is formed by a branch rod 42 of the main wheel lock plate 4 piercing through the upper connect hole 43 and the rod hole 141 of the fix block 14, in order to couple the main wheel lock plate 4 with the wheel stand 1 and enable it to sway freely. As for the auxiliary wheel lock plate 5, it is formed by a branch rod 52 piercing through the upper connect hole 53 and the rod hole 142 of the fix block 14, in order to couple the auxiliary wheel lock plate 5 with the wheel stand 1. Additionally, the hanging ring 541 of the fix spring 54 is used for connecting to the fix pin 132 situated on the rib of the auxiliary wheel bearing 13; the hanging ring 542 on the other end of the said fix spring 54 is to connect to the fix pin 55 situated on the side of the said auxiliary wheel lock plate 5, so that the jutted block 51 of the auxiliary wheel lock plate can be fixed to the ratchet 33 to stop the auxiliary wheel 3 moving in normal circumstances. Regarding the relative position of the said lock plates and ratchets, please refer to FIG. 3.

Figure 4:
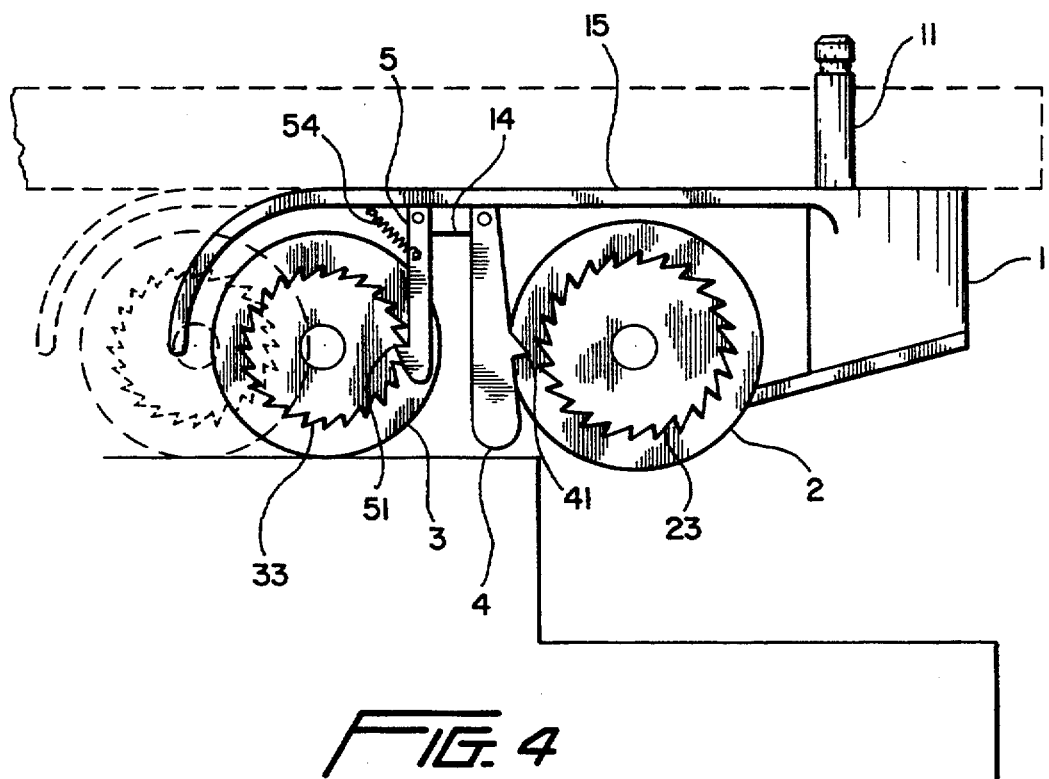
FIG. 4 is an illustration of the present invention on an uneven ground.

Furthermore, there is a plane protecting plate 15 in the said wheel stand 1 to support baby walker, and because the diameter of main wheel 2 is larger than the auxiliary wheel's, so between these two wheel bodies with same height in wheel centers, only the main wheel unit 2 can touch the ground, please refer to FIG. 5-A. The movable shaft 11 in the front of wheel stand 1 is used for dragging baby walker to the motion direction. When the baby walker be pulled to a hollow ground, referring to FIG. 4, the main wheel unit 2 will be suspended first since the shaft 11 always facing to the front, so the walker only can be supported with the auxiliary wheel 3. Owing to the auxiliary wheel lock plate 5 uses the fix spring 54 to make the jutted block 51 lock the auxiliary wheel ratchet 33, auxiliary wheel 3 cannot move forward but only back off. Fully considering babies' safety, one cannot ignore the possible risks though the force of babies pulling walkers is small. For this, the surface of auxiliary wheel 3 is made net-striped as a anti-slip surface 35. With multiplying the weight of both the baby and the walker by the increasing friciton factor producing from the anti-slip surface 35, the inertia force from the baby walker will be offset, and the possible slip of walker will as well be prevented. Therefore, the walker will not move any more, unless it be moved or going backward to release the main wheel 2 from suspending.

When the baby walker on a normal ground, the active baby might make the main wheel lock plate 4 block the main wheel ratchet 23, for avoiding this, a telescopic pipe 6 is installed between as a buffer, referring to FIG. 5-A. The fix pin 61 at one end of the said telescopic pipe 6 is inlaid into the pin hole 122 on the main wheel bearing 12; another pin 62 at the other end of the pipe 6 is inlaid into the hole 44 on the main wheel lock plate 4 to enable the flexible telescopic pipe 6 to absorb the swaying force from the main wheel lock plate 4. To assure the main wheel block 41 will not brake the main wheel ratchet 23, the lock plate 4 is designed to the shape of a lead piece to increase its weight, and the lock plate 4 is made to have a slant jut. When the baby walker moving forward, owing to the inertia effect, the motion direction of the main wheel lock plate 4 is backward, i.e. moves toward the auxiliary wheel 3, and because of the buffer of the telescopic pipe 6 and the gravity of special designed main wheel lock plate, it is hardly possible that the main wheel block 41 would lock the ratchet 23. If the baby walker is struck by an exterior force and cause the main wheel lock plate 41 to block the ratchet 23, the ratchet 23 will have revese motion and push the slant of the block 41, in additon to the downward gravity from the lock plate 4 itself and the flexibility from the telescopic pipe 6, the main wheel lock block 41 will be allowed to separate from the ratchet and keep the walker moving on. If the baby walker moving on a slope ground, referring to FIG. 5-B, the main wheel lock plate 4 will slant to the slope direction, and the slanting gravity itself is bigger than the stretching force producing from the telescopic pipe 6, which exhausting the air inside the telescopic pipe 6 out of the hole 63 and compressing the pipe to a flat shape, so that the block 41 on the main wheel lock plate can block the ratchet 23 to stop the walker to slide furtherly.

We claim:

1. A safety device for a baby walker comprising:
a) a wheel stand configured to support a baby walker;
b) a main wheel unit rotatably attached to the wheel stand so as to rotate about a first axis, the main wheel unit having at least one main wheel and a first ratchet on the at least one main wheel so as to rotate therewith, the at least one main wheel having a first diameter;
c) an auxiliary wheel unit rotatably attached to the wheel stand so as to rotate about a second axis, the auxiliary wheel unit having at least one auxiliary wheel and a second ratchet on the at least one auxiliary wheel so as to rotate therewith, the at least one auxiliary wheel having a second diameter less than the first diameter such that on a generally horizontal surface, the at least one main wheel will contact the surface when the at least one auxiliary wheel is out of contact with the surface;
d) a main wheel lock plate pivotably attached to the wheel stand and having a first ratchet pawl configured to engage the first ratchet, the main wheel lock plate being movable between a disengaged position wherein the first ratchet pawl is disengaged from the first ratchet and an engaged position wherein the first ratchet pawl engages to first ratchet so as to prevent rotation of the at least one main wheel in a first direction, whereby the main wheel lock plate moves into the engaged position when the safety device enters a downwardly sloping surface;
e) an auxiliary wheel lock plate pivotably attached to the wheel stand and having a second ratchet pawl thereon configured to engage the second ratchet; and
f) biasing means acting on the auxiliary wheel lock plate so as to bias the second ratchet pawl into engagement with the second ratchet so as to prevent rotation of the at least one auxiliary wheel in the first direction and permit rotation of the at least one auxiliary wheel in a second, opposite direction.

2. The safety device of claim 1 further comprising a telescopic pipe connected between the main wheel lock plate and the wheel stand to dampen the sway of the main wheel lock plate about its pivot attachment.

3. The safety device of claim 1 further comprising a non-skid surface on the periphery of the at least one auxiliary wheel.

4. The safety device of claim 1 wherein the main wheel unit comprises a pair of main wheels.

5. The safety device of claim 1 wherein the auxiliary unit comprises a pair of auxiliary wheels.

* * * * *